July 15, 1947.     E. B. THOMPSON     2,423,954
HOIST
Filed Nov. 29, 1944     2 Sheets-Sheet 1
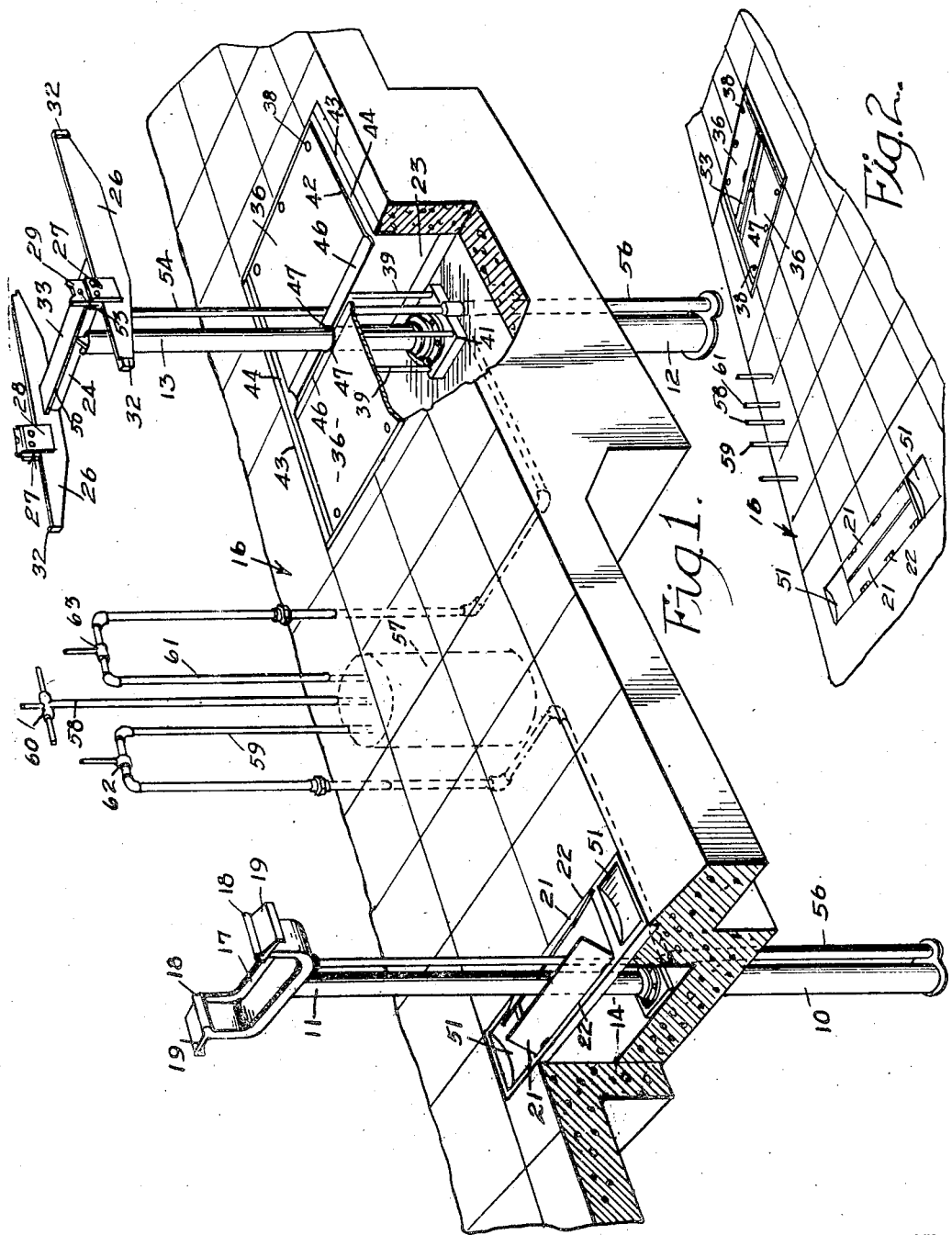
INVENTOR.
ELMER B. THOMPSON July 15, 1947.　　　　E. B. THOMPSON　　　　2,423,954
HOIST
Filed Nov. 29, 1944　　　　2 Sheets-Sheet 2

INVENTOR
ELMER B. THOMPSON
by Rudolph L. Lowell
atty

Patented July 15, 1947

2,423,954

UNITED STATES PATENT OFFICE 2,423,954

HOIST

Elmer B. Thompson, Des Moines, Iowa, assignor to Globe Hoist Company, Des Moines, Iowa, a corporation of Iowa Application November 29, 1944, Serial No. 565,699

5 Claims. (Cl. 254—89)

My invention relates generally to vehicle hoists or lifts and in particular to an automobile hoist adapted, in a lowered position to lie beneath the floor surface and covered to permit a free and unobstructed use of the floor space occupied by the hoist, and yet capable of immediate use to raise an automobile.

The hoist of my invention is of a type commonly referred to as a two post hoist, namely, a hoist having separate front and rear posts or pistons for lifting opposite ends of an automobile. Each of the pistons carries its own car axle support. As a result the space between the pistons is entirely open so that when an automobile is in a raised or lifted position on a two post hoist, free access is had to all of the under portions of the automobile between the two pistons for service purposes.

However, hoists of this type generally have the objection that in a lowered position the automobile axle supports on the front and rear pistons project above the floor surface, such as for example the two post hoist shown in Patent 1,849,777. As a result, when the hoist is lowered, the floor space occupied by the hoist is practically unusuable as a normal floor space, since care must be exercised to avoid personal injury by striking against the projecting parts, or driving automobiles, wheel dollies or the like against the projected parts.

In attempts to overcome this objection floor pits have been provided to receive the front and rear hoists beneath the floor surface, when the hoists are in a lowered position, as shown for example in my Patent 2,100,617. These attempts have not been entirely satisfactory, however, because of the fact that the rear axle support usually includes channel, H or I-shaped supporting members of a relatively large size, normally about four or five inches wide, and extended longitudinally of the axle support to accommodate automobiles of varying wheel bases. When the hoist is in a raised position the openings in the floor for receiving the supporting members remain open and uncovered. Since these openings are of a rather large size care must be practiced at all times by a service man working on a car to avoid having his foot slip into an opening. Thus although the hoist in my Patent 2,100,617 is adapted to provide for a normal use of the floor space, when the hoist is in a lowered position, injury may result to a service man by virtue of his foot slipping into one of the supporting member receiving-openings when the hoist is in a lifted position. Further the width of the supporting members appreciably reduces the space available for working on the car under parts when the hoist is in a raised position.

It is an object of my invention, therefore, to provide an improved automobile hoist.

A further object of my invention is to provide a hoist of two post type which is received below a floor surface in a lowered position, and adapted to provide for a free and safe use of the floor surface occupied by the hoist, when the hoist is in either a raised or lowered position.

Yet another object of my invention is to provide a rear axle supporting structure in a two post hoist in which the axle supporting members are of a construction capable of being received within a pair of relatively narrow openings which can be left uncovered at all times, without creating any potential physical hazard.

A feature of my invention is found in the provision of a two post hoist having a rear axle supporting structure including a pair of spaced longitudinally extended upright flat members, each of which carries a slidable block on its top edge movable to an axle-engaging position. The over-all width of a block is such that a floor opening for receiving a flat member and corresponding block thereon is of a relatively narrow width whereby the opening can be safely left uncovered at all times.

Yet another feature of my invention is found in the provision of an axle supporting structure for the rear post of a two post hoist, having a transversely extended beam member and an upright flat axle-engaging member at each end thereof, in which a plate for covering a beam-receiving opening in the floor is guidably supported for up and down movement in the beam.

Further objects, features and advantages of this invention will become apparent from the following description when taken in connection with the accompanying drawings in which:

Fig. 1 is a perspective view of my improved hoist in a raised position with certain parts broken away to more clearly show its construction;

Fig. 2 is a perspective view showing the hoist of my invention in a lowered position beneath the floor and completely covered to provide for a normal use of the floor space occupied by the hoist;

Figure 4:
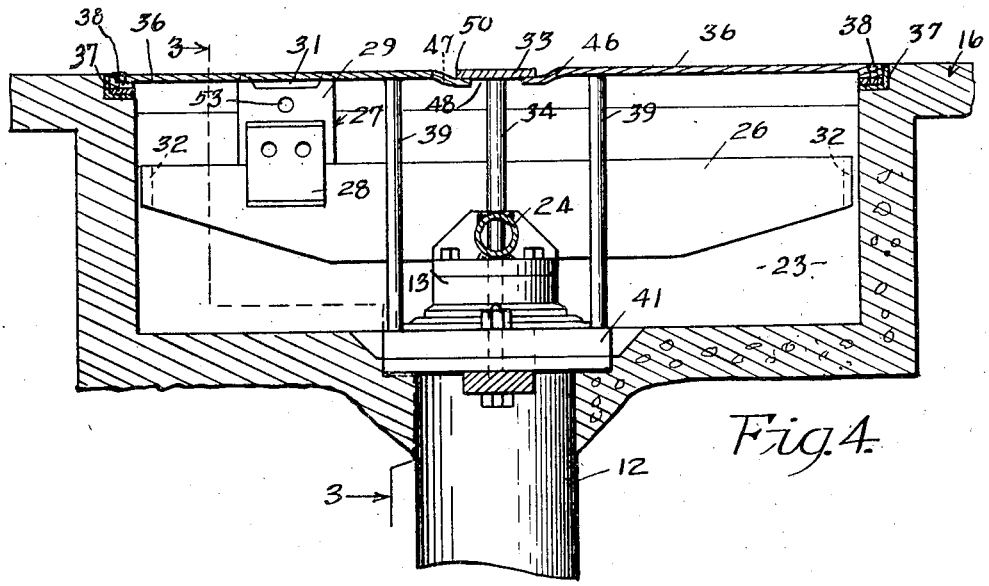
Fig. 4 is a sectional view of the rear axle-supporting structure as seen along the line 4—4 in Fig. 3.

With reference to the drawings there is shown in Fig. 1 an automobile hoist of two post type including front and rear hoists, with the front hoist having a cylinder 10 operatively associated with a piston or lifting member 11, and the rear hoist including a cylinder 12 and associated piston 13.

The front hoist is located in a pit 14 formed in a floor surface, indicated generally as 16, and includes a front axle-supporting structure or saddle 17 of a substantially U-shape fixed to the top of the piston 11 and having a raised axle-engaging rib 18 at the free end of each of its legs. A support 19, for an automobile spring pad, also at the free end of each leg of the U-shape saddle member 17, is extended outwardly from a corresponding rib 18. The opening at the top of the pit 14 is of a size and shape such that the saddle member 17, at the lowermost limit of travel of the piston 11, is received within the pit below the surface of the floor 16. With the saddle 17 thus located within the pit 14, the pit opening is automatically closed or covered by a pair of floor or cover plates 21 hinged at their outer sides 22 to opposite side walls of the pit opening for pivotal movement upwardly and away from each other to their open position, shown in Fig. 1, and for movement downwardly toward each other to a supported position on the ribs 18 to a closed position, shown in Fig. 2.

When the piston 11 is initially raised the cover plates 21 are pushed to their open positions by the saddle member 17. On a continued raising of the piston 11 the inner sides of the cover plates rest against the saddle member 17 and piston member 11 so as to be upwardly inclined toward each other, as shown in Fig. 1, to constitute side guards for the pit opening. This relative position of the cover plates 21 is maintained until the saddle member 17 is lowered into the pit 14, at which time the plates 21 follow the saddle member to their closed position. It is seen, therefore, that when the front hoist is at its lower limit of travel it is located entirely within the pit 14, the opening of which is closed by the plates 21 to provide a floor surface over the pit continuous or flush with the floor 16 as shown in Fig. 2. Upright projections, and consequent hazards resulting from striking such projections, are thus entirely eliminated. With the piston 11 in a raised position the inclination of the plates toward each other over the opening of the pit 14 prevents any accidental slipping by a person into the pit 14.

Figure 3:
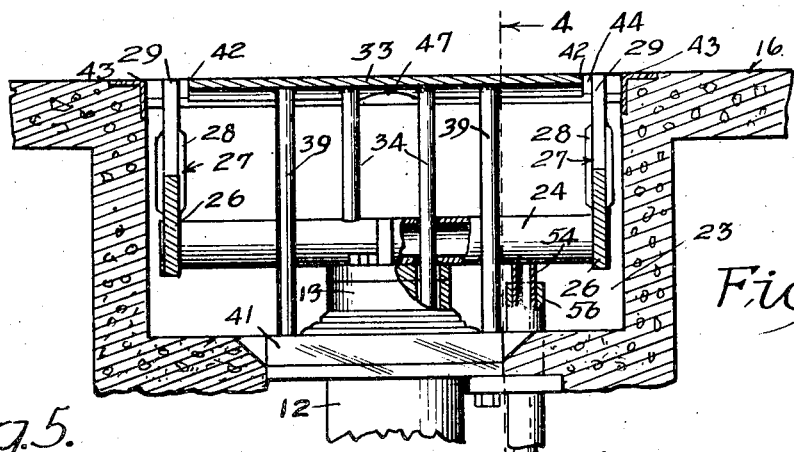
Fig. 3 is a transverse sectional view on the line 3—3 in Fig. 4 taken through the rear axle-supporting structure and floor plates, with the floor plates shown in position flush with the adjacent floor surface, and parts broken away for the purpose of clarity.

The rear hoist is mounted in a floor pit 23 and includes a rear axle supporting structure having a transversely extended tubular beam member 24 fixed at its central portion to the top of the piston 13 (Figs. 1, 3 and 4). Each end of the tubular beam 24 extends through the central portion of a flat upright longitudinally extended supporting member 26. The ends of the tubular beam 24 are fixed to a corresponding member 26 by welding and are substantially flush with the outer side surface of such member.

A rear axle-engaging block, indicated generally as 27, is slidably carried on the top edge of each upright supporting member 26 for movement longitudinally thereof to an axle-engaging position. Each block 27 (Figs. 3 and 4) is comprised of a pair of spaced guide members 28 having an axle-engaging member 29 welded between their upper ends so that the lower end of the block is of a substantially inverted U-shape adapted to straddle the upper end of a supporting member 26. The top edge of a member 29 is formed with an axle-receiving recess 31. Each end of a supporting member 26 is integrally formed with a stop 32 to limit the travel of a corresponding block 27 between such ends.

Adapted to rest on the top of the tubular beam 24 and between the end or supporting members 26 is a vertically movable cover plate 33 having a pair of downward extensions 34 guidably extended through the tubular beam 24 for movement within the top of the piston 13. As best appears in Fig. 5 the width of the plate 33 is greater than the diameter of the tubular beam 24 so that the sides of the plate extend outwardly to each side of the tubular beam 24.

The opening of the rear pit 23 is of a size and shape such that when the piston 13 is at its lowermost limit of travel the rear axle supporting structure is receivable therein at a position below the level of the floor 16. A closing of the pit opening when the rear hoist is in either a lowered or raised position is accomplished by the provision of means including a pair of cover plates 36.

Figure 5:
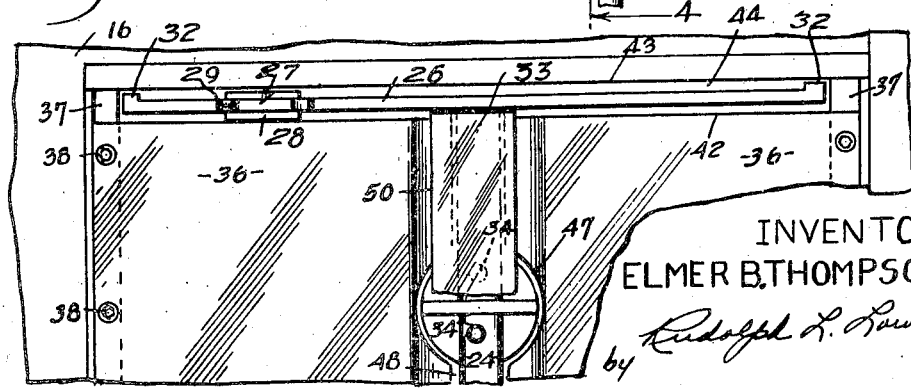
Fig. 5 is a fragmentary plan view of the rear axle-supporting structure with parts broken away.

With reference to Figs. 1, 2 and 5 it is seen that the cover plates 36 are of a substantially rectangular shape with their inner sides 46 spaced from each other to form a transverse opening 48. Each side of the pit 23 is provided with a recessed portion adapted to receive an angle iron 37 which constitutes a supporting shoulder for the outer end of a plate 36. The outer end of each plate 36 is secured to a corresponding angle member 37 by screws or like means 38. Fixed adjacent the inner end of each plate 36 and projected downwardly therefrom are a pair of supporting rods 39 the lower ends of which rest on a square shaped flange member 41 mounted at the top of the cylinder 12. It is thus seen that the opposite sides of a plate 36 are rigidly supported to hold the plate at a position substantially flush with the floor 16. Each end 42 of a plate member 36 (Figs. 1 and 5) is spaced inwardly from an adjacent end 43 of the pit 23 to provide a longitudinally extended opening 44, open to an end of the transverse opening 46 and adapted to loosely receive therethrough a supporting member 26 with a block 27 thereon.

In one embodiment of my invention each supporting member 26 is about four feet long and three-quarters of an inch thick. In a block 27 the member 29, which rides on the top edge of a supporting member 26, is also made of three-quarter inch material, with the guides 28 being made from substantially three-eighths inch stock. The over-all width of the block 27 is thus about one and one-half inches.

In order to loosely receive the member 26 with its block 27 thereon, a space 44 between the end 42 of a plate 36 and an adjacent end 43 of the pit 23 may be of a width up to about two and one-half inches. It is apparent, therefore, that a space 44 is of a relatively narrow width so that such space can be left uncovered without creating any dangerous or hazardous pitfall for a person to slip into. As a result automobiles, wheel dollies and the like can be readily driven over the space 44, and a person can easily step across or on a space 44 with complete safety.

The inner side 46 of each plate 36 (Figs. 4 and 5) is bent downwardly and then horizontally to form a supporting ledge or shoulder for a side 50 of the cover plate 33. As best appears in Figs. 2 and 5 the central portions of the inner sides 46 of the plates 36 are formed with oppositely arranged arcuate recesses 47 adapted to receive the piston 13 therebetween. By virtue of the recesses 47 the transverse opening 48 between the plate ends 46 is capable of being reduced to a width slightly larger than the diameter of the tubular beam 24 to permit the beam 24 to pass through the space 48 to a position within the pit 23 and below the plates 36, which position is shown in Figs. 2 and 4.

When the rear hoist is at its lowermost position of travel the transverse opening 48, between the plates 36, is covered by the plate 33, as shown in Figs. 2 and 4, whereby the pit 23 is completely closed except for the longitudinal openings 44 adjacent the pit sides 43. As I have fully explained above the openings 44 are of such a narrow width that they in no way interfere with the passing of vehicles or persons thereover. Further the arcuate recesses 47 in the plates 36 are partially covered by the plate 33 so that when the rear hoist is in a lowered position the floor space occupied thereby is entirely free and unobstructed.

On an initial raising of the piston 13 the supporting members 26 are lifted from their places within the openings 44. On a continued raising of the piston 13 the cover plate 33 is engaged by the tubular beam 24 and lifted from the covers 36. When this engagement takes place the plate 33 is supported on the beam 24 and raised as a unit with the rear axle supporting structure. On lowering of the piston 13 the cover plate 33 remains in a supported position on the tubular beam 24 until the beam is received within the space 48 and substantially beneath the plates 36. At this position of the beam 24 the opposite sides of the cover plate 33 are engaged and supported by the inner ends 46 of the plates 36 so as to be retained against further downward movement on a continued downward movement of the piston 13 to a position at which the rear axle supporting structure is entirely within the pit 23. It is thus seen that the vertical movement of the cover plate 33 is entirely automatic, with the plate 33 in a raised position of the piston 13 being carried on the beam 24 below the top level of the supporting members 26.

In the operation of the hoist the front and rear hoists are initially in their lowered positions within the pits 14 and 23, respectively. An automobile is then driven over the hoists to a position in which the front wheels thereof are received in depressions 51 arranged at opposite sides of the pit 14. With the front wheels of the automobile located in the depressions 51 the automobile front axle is properly located above the saddle member 17 for support on the engaging ribs 18.

With the front axle of the automobile thus positioned for proper engagement by the front hoist the blocks 27 on the rear axle-supporting structure are slidably moved longitudinally of corresponding supporting members 26 to positions beneath the rear axle of the automobile. In other words the automobile front axle is "spotted" relative to the engaging ribs 18, and the blocks 27 are movable to varying positions on the supporting members 25 corresponding to the particular wheel base of the automobile being lifted. The movement of a block 27 to a rear axle-engaging position is facilitated by the provision of an opening 53 in the upper member 29 of each block 27 so that a usual hook iron can be extended beneath the automobile and inserted within such opening. With the front and rear hoists thus properly set for engaging the front and rear axles, respectively, of the automobile, the hoists are concurrently operated to raise the pistons 11 and 13 to desired elevations. To prevent rotation of the pistons 11 and 13 I provide a guide rod 54 in the front hoist fixed at its upper end to the saddle member 17 and guidably supported in a sleeve or pipe member 56 located in the pit 14 adjacent the cylinder 10. A like guide rod 54 for the rear hoist is fixed at its upper end to the tubular beam 24 with its lower end guidably supported in a sleeve member 56 mounted in the pit 23 adjacent the cylinder 12.

The pistons 11 and 13 are raised and lowered in a usual manner by means including a buried air pressure tank 57 connected with a compressor or the like (not shown) by an inlet pipe 58 having a control valve 60. The tank 57 is connected with the front cylinder 10 through a pipe 59, while the rear cylinder 12 is connected with the tank 57 through a pipe 61. The pipes 59 and 61 are provided with suitable control valves 62 and 63, respectively, conveniently located above the floor 16 for simultaneous actuation by a hoist operator. The cylinders 10 and 12 are of a usual hydraulic type, with the admission of air under pressure to a cylinder acting on the fluid in the cylinder to in turn raise a corresponding piston in a manner which is well known in the art.

From a consideration of the above description it is seen that my invention provides a two post automobile hoist, in which the front and rear hoists are capable of being received entirely within floor pits and covered flush with a floor surface without leaving any objectionable openings uncovered. In the rear hoist this is accomplished by the provision of the relatively narrow supporting members 26 which not only provide for their reception in relatively narrow floor openings 44 which may be left uncovered, but also permit greater access to the automobile parts located beneath and adjacent the rear end of the automobile. The blocks 27 are of a construction such that they are receivable within the floor openings 44 while carried on the supporting members 26, so as to eliminate any inconvenience in their removal prior to lowering the rear hoist to a position within the pit 23. In this connection it is to be importantly noted that the blocks 27 project above the supporting members 26. This is due to the fact that in some of the automobiles now in commercial use the usual gas or fuel tank has the bottom thereof below the level of the rear axle. Since the fuel tank generally extends over substantially the complete width of the car, it is apparent that without the provision of the blocks 27 the members 26 would engage the fuel tank rather than the automobile rear axle.

Although my invention has been described with respect to a preferred embodiment thereof it is to be understood that it is not to be so limited since changes and modifications can be made therein in a manner within the full intended scope of my invention as defined by the appended claims.

I claim:

1. In a vehicle lift including a lift member mounted in a floor pit and movable to a lowered position within said pit below the level of the floor surface, an axle supporting structure carried at the upper end of said lift member comprising a transverse beam member, a pair of oppositely arranged longitudinally extended substantially flat upright plate members fixed on said beam, said floor surface having a transverse opening therein adapted to receive said beam member therethrough, and a pair of longitudinally extended openings open to said transverse opening for receiving said upright members, with said transverse opening and said longitudinal openings being of substantially the same width, and means for covering said transverse opening when said axle supporting structure is lowered within said pit, with said longitudinal openings being of a width conforming substantially to three times the thickness of said upright members and left uncovered at all moved positions of said lift member.

2. In a vehicle lift, a lift member mounted in a floor pit and movable to a lowered position within said pit below the level of the floor surface, a transverse beam member carried adjacent the upper end of said lift member, a longitudinally extended substantially flat upright plate member fixed to each end of said beam, an axle engaging block for a supporting member movable on the top edge thereof to an adjusted position, said block having an over-all thickness substantially equal to twice the thickness of an upright member, and said floor surface having a transverse opening for receiving said beam member therethrough, and a pair of longitudinally extended openings open to said transverse opening, with each of said longitudinal openings being adapted to receive therein a supporting member with a block thereon, said longitudinal openings being of a width conforming substantially to the over-all thickness of an axle engaging block plus a working clearance, and left uncovered at all moved positions of said lift member.

3. In a vehicle lift including a lift member mounted in a floor pit and movable to a lowered position within said pit below the level of the floor surface, an axle carrying structure at the upper end of said lift member including a transverse beam, longitudinally extended axle supporting members secured to the ends of said beam, said floor surface having a transverse opening therein to receive said beam therethrough, and a pair of longitudinally extended openings open to the ends of said transverse opening for receiving said axle supporting members, a vertically movable cover plate arranged between said supporting members for covering said transverse opening, downwardly projected members on said cover plate guidably extended through said beam member and into said lift member, said cover plate, at a raised position of said lift member, being supported on said beam member and adapted to engage and be supported on the sides of said transverse opening when said beam member is lowered within said pit, with said projected members being within the confines of said beam member and said lifting member, when said cover plate is supported on the beam member.

4. In a vehicle lift, including a lift member mounted in a floor pit and movable to a lowered position within said pit below the level of the floor surface, a transverse beam carried adjacent the upper end of said lift member, said lift member having a diameter greater than the dimension of said beam in a direction longitudinally of said vehicle lift, longitudinally extended substantially flat upright plate members carried at the ends of said beam member, said floor surface having a transverse opening therein for receiving said beam member therethrough, and a pair of longitudinally extended openings arranged at opposite ends of said transverse opening and open to said transverse opening for receiving said supporting members, with the sides of said transverse opening having oppositely arranged recesses therein conforming substantially in size and shape to said lift member to receive said lift member therebetween, and a cover plate movably supported on said beam member and extended between said supporting members, said cover plate, when said beam is lowered through said transverse opening into said pit, being adapted to rest on the sides of said transverse opening to cover the same, with said longitudinal openings being of a width conforming substantially to three times the thickness of said upright members and left uncovered at all moved positions of said lift member.

5. In a vehicle lift including a lift member mounted in a floor pit and movable to a lowered position within said pit below the level of the floor surface, an axle supporting structure carried at the upper end of said lift member comprising a transverse beam member, and a pair of oppositely arranged longitudinally extended substantially flat upright plate members fixed on said beam, said floor surface having a transverse opening therein adapted to receive said beam member therethrough, and a pair of longitudinally extended openings open to said transverse opening for receiving said upright members, with said longitudinal openings being of a width of less than about two and one-half inches.

ELMER B. THOMPSON.

REFERENCES CITED

The following references are of record in the file of this patent:

UNITED STATES PATENTS

| Number | Name | Date |
| --- | --- | --- |
| 1,170,280 | Koenig | Feb. 1, 1916 |
| 2,002,578 | Johnston | May 28, 1935 |
| 2,015,357 | Weaver | Sept. 24, 1935 |
| 2,100,617 | Thompson | Nov. 30, 1937 |
| 2,215,934 | Pierce | Sept. 24, 1940 |
| 1,915,024 | Logette et al. | June 20, 1933 |